United States Patent [19]

Hedeen

[11] Patent Number: 5,267,907
[45] Date of Patent: Dec. 7, 1993

[54] CONTROL SYSTEM FOR VARIATION OF THE SHEAVE RATIO IN A CONTINUOUSLY VARIABLE TRANSMISSION

[75] Inventor: Robert A. Hedeen, Clifton Park, N.Y.

[73] Assignee: Borg-Warner Automotive, Inc., Sterling Heights, Mich.

[21] Appl. No.: 990,600

[22] Filed: Dec. 14, 1992

[51] Int. Cl.$^5$ .............................................. F16H 7/00
[52] U.S. Cl. ............................................ 474/69; 474/18
[58] Field of Search ................. 474/8, 11, 12, 17, 18, 474/28, 69, 70, 49-51; 74/865-867

[56] References Cited

U.S. PATENT DOCUMENTS

| | | | |
|---|---|---|---|
| 3,720,113 | 3/1973 | Van Doorne et al. | 474/242 |
| 4,313,730 | 2/1982 | Cole et al. | 474/201 |
| 4,516,963 | 5/1985 | Mott | 474/245 |
| 4,516,964 | 5/1985 | Laster | 474/245 |
| 4,516,965 | 5/1985 | Mott | 474/245 |
| 4,579,021 | 4/1986 | Yamamuro et al. | 74/869 |
| 4,650,445 | 3/1987 | Mott | 474/201 |
| 4,853,858 | 8/1989 | Kumura | 474/18 X |
| 5,194,049 | 3/1993 | Knop, Jr. | 474/69 |

Primary Examiner—Thuy M. Bui
Attorney, Agent, or Firm—Willian Brinks Olds Hofer Gilson & Lione

[57] ABSTRACT

A control system for a continuously variable transmission reduces the noise generated as a result of the use of an articulated belt for connecting the first and second variable pulleys. The control system dithers the ratio set point in order to prevent a cyclic repetition of the forces between the belt and the pulleys. This reduces the amplitude of noise peaks generated at discrete frequencies by operation of the transmission resulting in a decrease in the level of perceived noise.

12 Claims, 3 Drawing Sheets

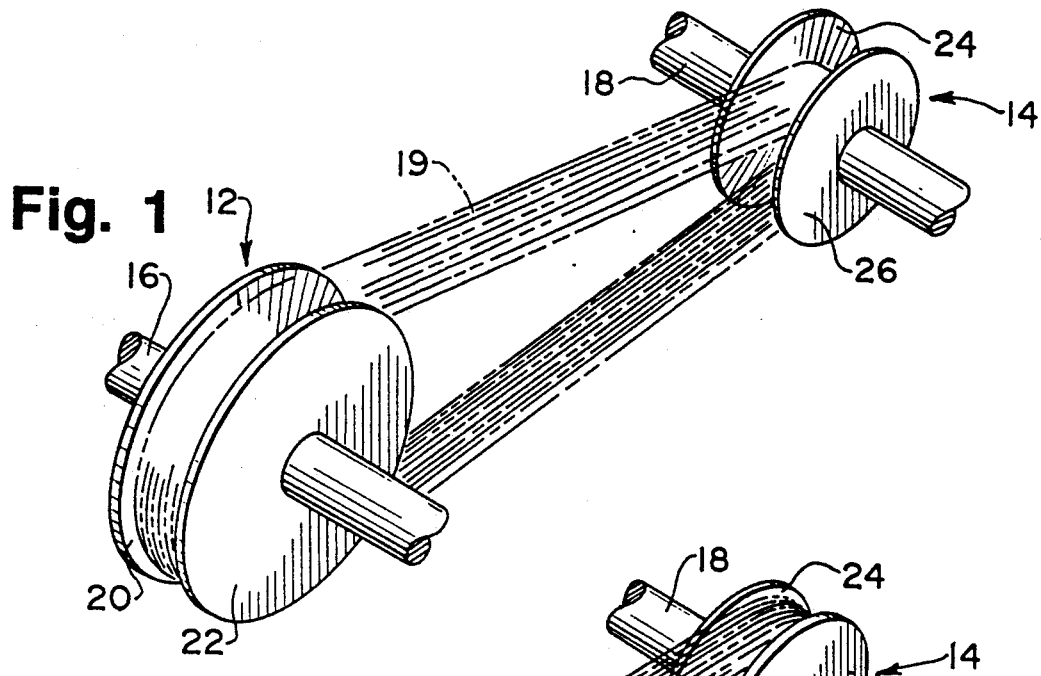
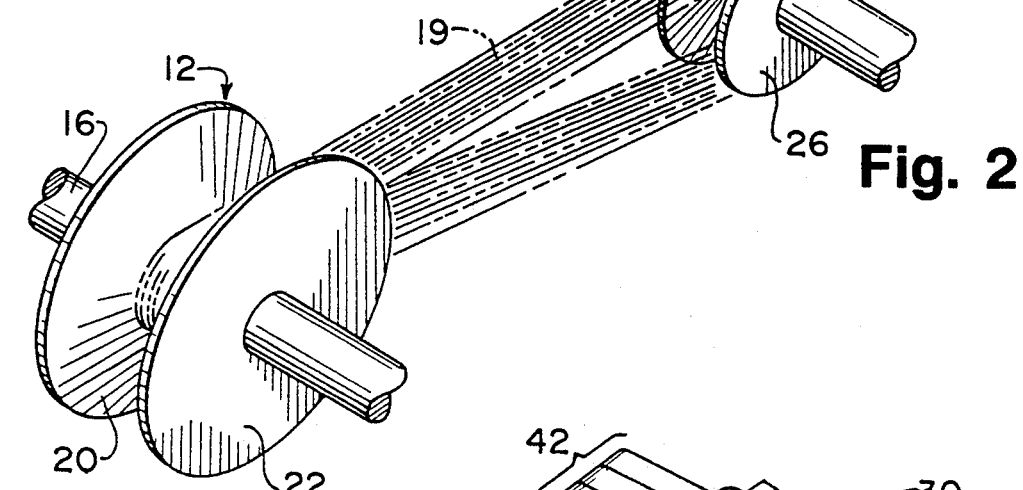
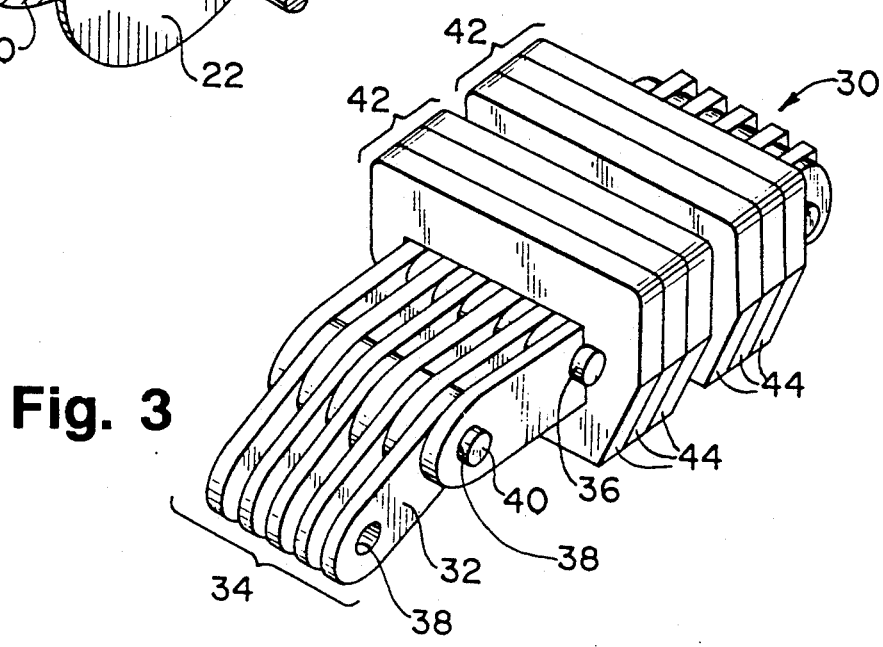

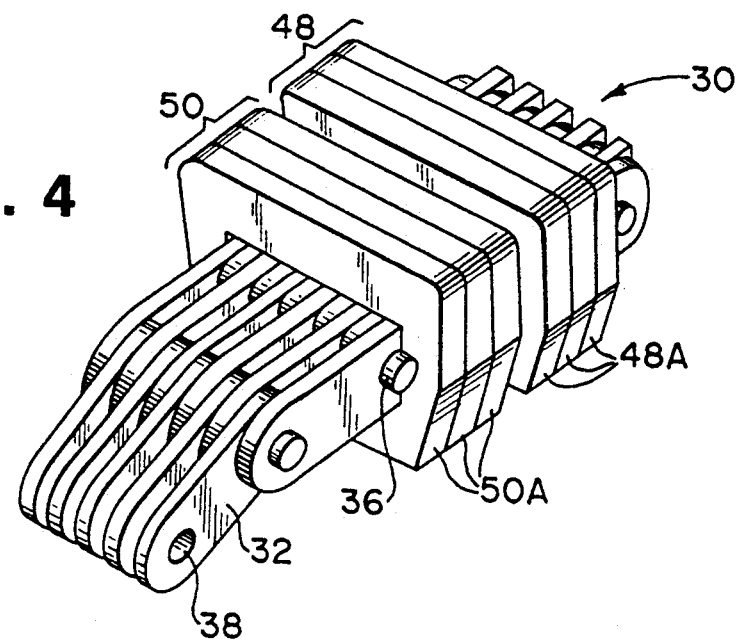
Fig. 4
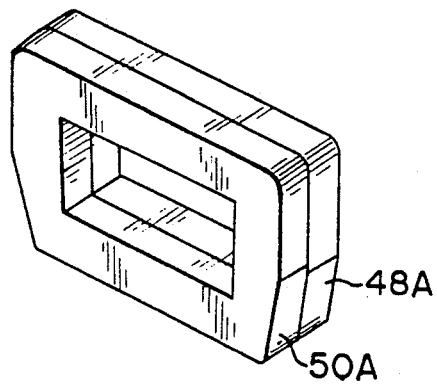
Fig. 5
Fig. 6
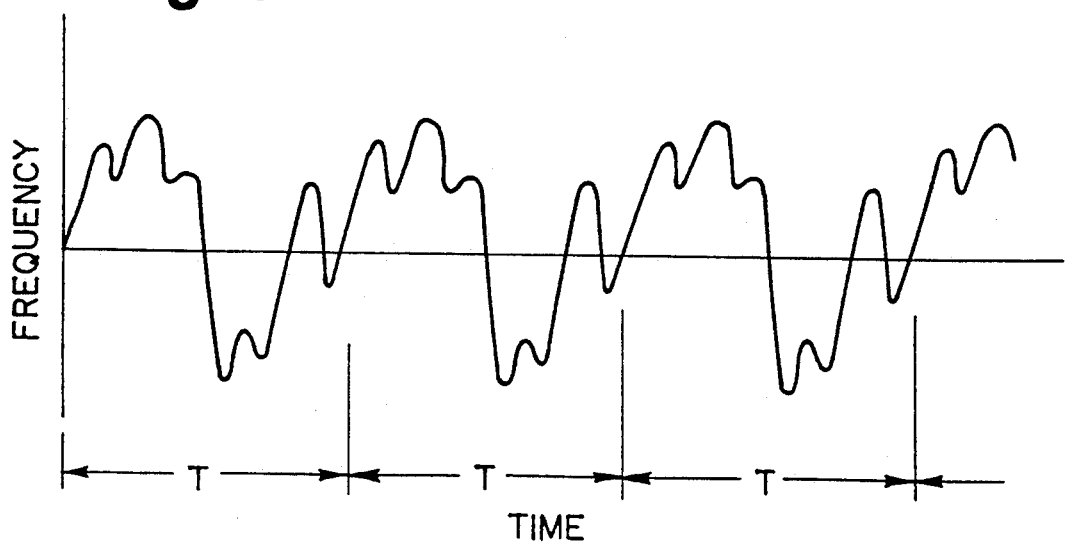

CONTROL SYSTEM FOR VARIATION OF THE SHEAVE RATIO IN A CONTINUOUSLY VARIABLE TRANSMISSION

BACKGROUND OF THE INVENTION

1. Field Of The Invention

This invention relates to continuously variable transmissions (CVTs) and the noise developed as a result of the use of a power transmission chain-belt to transfer torque between the transmission input and output sheaves. More particularly, this invention relates to a control system for varying the drive sheave ratio in a CVT at a rate differing from the belt-pass frequency in order to provide a lower noise chain-belt drive system.

2. Description Of The Prior Art

Continuously variable transmissions that include a variable pulley arrangement for transferring torque from an input shaft to an output shaft have been known for some time. In such transmissions, a first variable pulley is mounted on a first, or input, shaft and a second variable pulley is mounted on a second, or output shaft. A flexible belt of metal or elastomeric material interconnects the two pulleys to transfer torque between them. The primary or first pulley is driven by the engine and the output of the secondary or second pulley drives the drive train of the vehicle. Each pulley has one sheave axially movable relative to the other sheave to change the effective pulley diameter. By varying the effective pulley diameter of the first pulley, the transmission belt can be forced outward on the first pulley and pulled inward on the second pulley or vice versa. The movement of the sheave of the primary pulley servo regulates the transmission ratio across the CVT. The hydraulic pressure of the sheave of the secondary pulley servo varies the clamping force on the chain-belt connecting the primary and secondary pulleys. Maximum operating efficiency of the engine can be approached by varying the ratio across the pulleys to adjust the transmission to give an optimum speed ratio for each specific load.

Flexible continuous rubber belts have been employed to transfer torque between the first and second pulleys of a CVT. These belts, however, are subject to wear as a result of torque loads and adverse conditions. For CVT usage, flexible metal chain-belts have therefore been developed.

Flexible belts for use with a CVT are generally of two types, those referred to as "push" belts and those referred to as "pull" belts. An examples of a "push" belt is described in Van Doorne et al. U.S. Pat. No. 3,720,113 and an example of a "pull" belt can be found in Cole Jr. et al. U.S. Pat. No. 4,313,730. The push type belts include an endless array of nested metal bands and an endless array of load blocks free to move longitudinally along the metal bands.

The pull type belt typically includes an endless chain as the carrier made from a plurality of links pivoted by pivot pins with a plurality of load blocks encircling the links. The pivot pins prevent the load blocks from moving longitudinally relative to the links. The load blocks are generally trapezoidal in shape and have edge surfaces for engaging the flanges of the pulleys for transferring torque between the pulleys. Pull type belts tend to be simpler and therefore less expensive to manufacture than the push type belts as the chain links and load blocks can be of composite width allowing the links and load blocks to be stamped from sheet material. In addition, the pins can be cut from extruded stock also keeping costs low. The present invention relates to CVTs with both push-type and pull-type belts.

The use of articulated chain-belts to transfer torque from the input shaft to the output shaft of a CVT results in a noise spectrum generated by the engagement of the load blocks and the pulley flanges. The generated noise spectrum generally has peaks providing discernable pure tones. A noise spectrum which has peaks at certain frequencies in a regular pattern is less acceptable to the human ear than white noise, that is, a noise spectrum with an irregular pattern, or lack of pure tones. A white, irregular or arrhythmic noise is less noticeable and annoying than a noise spectrum which contains recognizable pure tones of a single frequency.

One way in which the generation of these pure tones has been understood is in terms of forces acting to squeeze the input and output shafts of the CVT together. These forces are transferred to the shaft bearings and into the casing of the CVT where vibrations are set up that generate pure tones. The forces on the pulley shafts are believed to be produced as a result of the articulation of the chain-belt.

An articulated chain-belt does not conform exactly to the shape of the pulleys as it follows its path about the sheave. Instead, it forms a polygon that closely resembles the curvature of the pulleys. This relationship results in a condition that is described as chordal action. As the belt moves around the pulleys, the motion of the chain-belt includes a radial as well as a longitudinal component. This radial motion changes the effective length of the chain-belt and creates a cyclic tensioning in the portion of the chain-belt connecting the two pulleys.

For belts having a regular pitch length, known as "straight pitch" belts, the tensioning cycle will occur at the rate at which successive pitches of the chain pass a given point. This frequency is termed the "pitch-pass frequency" or "belt-pass frequency". As a result of the cyclic tensioning, the input and output shafts are squeezed together and released at the pitch-pass frequency. This relative motion of the input and output shafts is small but results in vibrations being transmitted to the casing of the transmission system, which although small in amplitude are of relatively high energy. These vibrations generate a noise pattern that includes a discernable peak at the pitch-pass frequency which is perceived at an unacceptably high level by the human ear.

Several chain-belts of different constructions have been developed to modify the pitch-pass frequency in order to reduce the amplitude of the noise peaks at this frequency and make the perceived level of noise generated more acceptable. These belts are termed "random pitch" belts. For example, U.S. Pat. No. 4,650,445 describes a chain linked at pivot points by a pair of pivot pins designed to vary the chordal action of at least some of the links to alter the pitch-pass frequency and thereby modify the noise patterns generated. U.S. Pat. No. 4,516,964, describes load blocks of different transverse widths, all of which contact the pulley flanges but some at different radial locations of the sheaves. The regularity of the pitch-pass frequency is therefore modified and the noise pattern modified. U.S. Pat. No. 4,516,965, describes load blocks of different transverse widths that do not contact the pulley flanges to modify the generated noise pattern. Alternatively, load blocks are "skipped" to modify the generated noise pattern. U.S.

Pat. No. 4,516,963 describes load blocks having a random mixture of load block pulley flange engaging areas to provide random engagement and thereby modify the noise patterns generated.

The prior art chain-belts described in U.S. Pat. Nos 4,516,963, 4,516,964, 4,516,965 and 4,650,445, incorporated herein by reference and discussed above, are effective in modifying the contact pattern to reduce the amplitude of noise at the pitch-pass frequency. The present invention is directed to modification of the chain-belt contact pattern by a variation in the sheave ratio at a rate different from the belt-pass frequency.

OBJECTS OF THE INVENTION

Accordingly, it is an object of this invention to provide a system for reducing perceived noise in the belt and sheave system of a continuously variable transmission that meets the aforementioned needs.

It is a specific object of this invention to provide a system for reducing the amplitude of pure tones produced as a result of using an articulated belt to transfer torque between a pair of pulleys of a CVT.

Other objects, advantages and features of this invention will become apparent on reading the following description and appended claims, and upon reference to the accompanying drawings.

SUMMARY OF THE INVENTION

The noise spectrum generated by a CVT chain-belt includes peaks at discrete but closely spaced frequencies. This noise is termed "machinery noise". The peaks are found at frequencies that are harmonics of the frequency with which the chain-belt makes one complete cycle, or pass, around the pulleys. This frequency is termed the "belt-pass frequency". It is believed that the harmonic peaks are created as a result of the repetition of the tensioning forces between the input and output shafts during each cycle of the belt.

The system of this invention provides a means for reducing the amplitude of the harmonic peaks to further reduce the perceived level of noise generated by use of an articulated chain-belt. The repetition of forces between the belt and the sheaves during each cycle is substantially reduced by varying the ratio set point of the continuously variable transmission by a small amount at a frequency different from the belt-pass frequency. The variation in ratio causes the belt pass frequency to fluctuate ensuring that the forces between the belt and the pulleys do not repeat themselves during each cycle of the belt. As a result, some of the energy in the harmonic peaks is shifted to non-harmonic frequency. The amplitude of the harmonic peaks is thereby lowered which reduces the perceived noise level.

In accordance with one embodiment of this invention, a continuously variable transmission system includes a chain-belt for drivingly connecting first and second variable pulleys of a continuously variable transmission. The first pulley, or input pulley, has a first sheave and a second sheave with the first sheave being movable relative to the second sheave to vary the ratio between the first and second pulleys. The second pulley, or output pulley, also has first and second sheaves with the first sheave being movable relative the second sheave. The chain-belt passes around the pulleys at a belt-pass frequency and includes a plurality of links to permit articulation of the chain-belt. A control system provides a signal for regulating the position of the first sheave of the first pulley to provide a ratio set point. Another signal is generated and superimposed upon the ratio set point to vary the ratio across the pulleys by a small amount. The other signal provides a small repetitive ratio change at a frequency substantially below that of the belt-pass frequency.

BRIEF DESCRIPTION OF THE DRAWINGS

For a more complete understanding of this invention, reference should now be made to the embodiment illustrated in greater detail in the accompanying drawings and described by way of example only. In the drawings:

FIGS. 1 and 2 are perspective views of the pulleys of a CVT in the extreme drive ratios;

FIG. 3 is a partial perspective view of a chain-belt with regularly positioned load blocks of equal size;

FIG. 4 is a perspective view of a chain-belt having load blocks of varying widths;

FIG. 5 is a comparison of the sizes of the adjacent load blocks of FIG. 4;

FIG. 6 is a graph indicating the forces produced between the chain-belt and sheaves over several time periods;

DETAILED DESCRIPTION OF THE DRAWINGS

Figure 7:
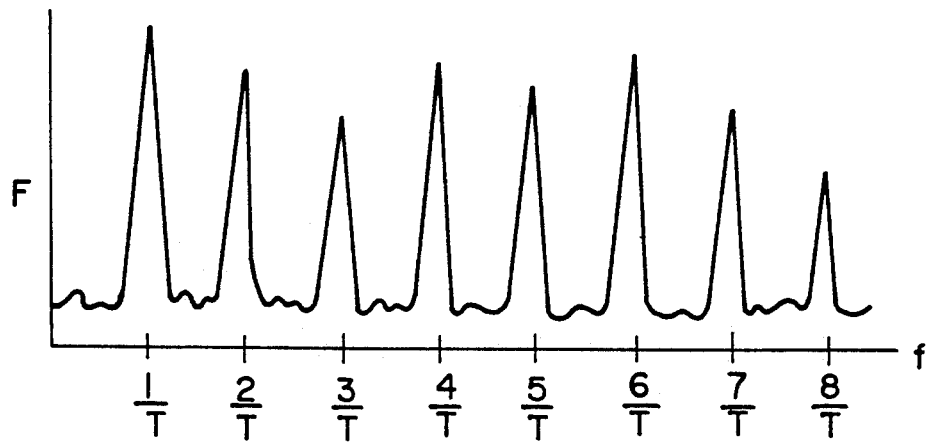
FIG. 7 is a graph indicating the forces illustrated in FIG. 6 in the frequency domain.

FIGS. 1 and 2 illustrate a variable pulley transmission 10 that includes a first variable pulley 12, or input pulley, and a second variable pulley 14, or output pulley, mounted on first and second shafts 16, 18, respectively. The pulleys are interconnected by an endless transmission belt 19. The first pulley 12 has first and second sheaves 20, 22 and the second pulley 14 has first and second sheaves 24, 26. At least one of the sheaves of each pulley is movable axially along the shaft on which the pulley is mounted. By changing the axial position of the movable sheaves on their respective shafts, the drive ratio between the first and second pulleys can be altered between the extremes illustrated in FIGS. 1 and 2. The input shaft 16 is connected to an engine (not shown). The pulley on that shaft is the input (primary) pulley. The other pulley is then the output (secondary) pulley and the shaft 18 on which it is mounted drives the vehicle drive system (also not shown).

A portion of one type of chain-belt 30 suitable for forming the endless transmission belt 19 is illustrated in FIG. 3. The chain belt 30 includes a plurality of links 32 arranged in sets or ranks 34. Each link 32 has first and second apertures 36, 38 located at opposite ends of the link. Both of the apertures 36, 38 of links 32 in the same rank 34 are aligned. The links 32 of adjacent ranks 34 are interleaved. The first apertures 36 of links in one rank are aligned with the second apertures 38 in the links of the adjacent rank. Pivot pins 40 are positioned in the aligned apertures to hold adjacent ranks in pivotal relation. Other types of pivot means such as pins and rocker joints can be used.

Disposed between adjacent pivot pins 40 are load blocks 42. These load blocks 42 seen in FIG. 3 are generally trapezoidal in shape and surround the chain links 32 of a rank 34. The load blocks 42 may be positioned between every pair of adjacent pins 40 or may be randomly positioned to break up the pure tones generated as a result of a repetition of forces between the belt and the sheaves at the pitch-pass frequency.

The load blocks 42 are typically laminates formed from a number of pieces 44 stamped from sheet material for ease of manufacture. Each piece 44 has sloped sides 46 for engagement with the bevel of the pulley sheaves of the first and second pulleys 12, 14 to provide the driving force between the input and output shafts. An alternative load block arrangement can be seen in FIGS. 4 and 5 where load blocks 48A of one width are interdispersed with load blocks 50A of a different width. The positions at which the load blocks 48, 50 contact the pulley sheaves of the first and second pulleys are different, varying the pitch-pass frequency. The use of load blocks of differing widths is described in greater detail in U.S. Pat. No. 4,650,445. Variation in pitch-pass frequency reduces the amplitude of the pure tones reducing the perceived noise level generated by the chain-belt.

As mentioned previously, the regularity of the belt-pass frequency results in a noise pattern having a series of harmonic peaks. The pattern of recurrent forces between the chain-belt and sheaves is illustrated in FIGS. 6 and 7 in the time and frequency domains, respectively. The noise produced by these forces occurs at the same frequencies, and at a roughly proportional amplitude. The series of harmonics can be seen particularly clearly in FIG. 7 where T is the belt-pass frequency. Noise reduction is achieved by varying the ratio set point at the input pulley of the CVT by a small amount at a frequency different from the belt-pass frequency. The superposition of a low frequency signal upon the ratio set point will be referred to as "dither" in this application. By dithering the ratio set point in this manner, the belt-pass frequency is modulated and the forces between the chain and the sheaves are modulated over each cycle. As a result, some of the energy in the harmonic peaks is shifted to non-harmonic frequencies. This lowers the amplitude of the harmonic peaks and with it the perceived noise level.

Figure 8:
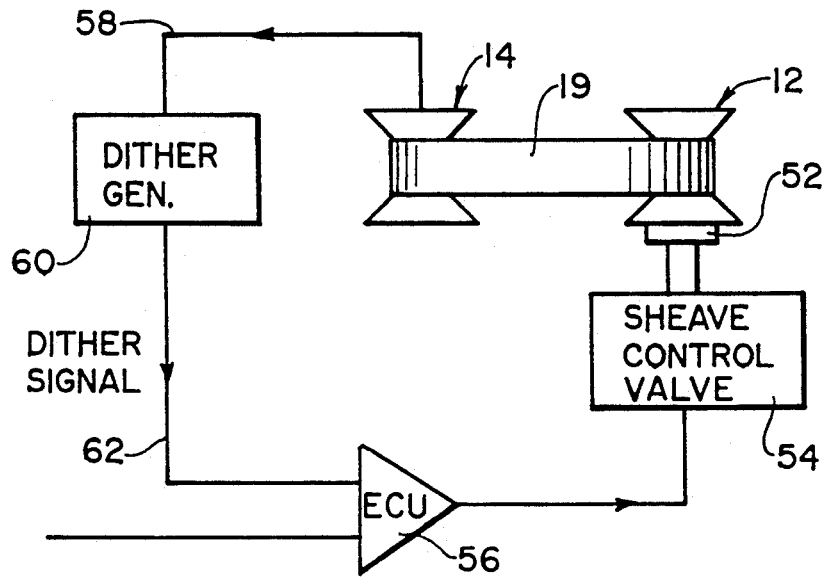
FIG. 8 is a schematic representation of a continuously variable transmission system of this invention.

The ratio across the pulleys of a CVT shown in FIG. 8 is typically controlled through a hydraulic circuit that supplies fluid to a servo-chamber 52 attached to the movable sheave of the primary pulley 12. The fluid in the servo-chamber 52 is typically regulated by a solenoid activated spool valve 54. An electronic control unit (ECU) 56 provides a duty cycle signal for regulating the solenoid actuated spool valve 54. The generated duty cycle maintains the ratio across the pulleys at a ratio set point developed in response to engine conditions and regulated to achieve smooth and efficient operation of the transmission.

The control system represented schematically in FIG. 8 is adapted to dither the ratio set point across the pulleys by superimposing a small ratio change upon the ratio set point. By dithering, the ratio set point is modulated about the belt-pass frequency level and the forces between the belt and the sheaves are varied from one pass to another. This reduces the build up of harmonic vibrations in the transmission casing resulting in a reduction in the amplitude of the harmonic noise peaks. The duty cycle signal delivered to the solenoid actuated spool valve can be dithered in a number of ways.

In a typical ratio control system, such as that illustrated in FIG. 8, a feedback signal representative of the actual ratio across the pulleys is sent to the ECU 56. The duty cycle signal is modified in accordance with the feedback signal on line 58 to ensure that the actual ratio across the pulleys corresponds to the ratio set point. The system represented schematically in FIG. 8 generates a dither signal at dither generator 60 superimposed on the feedback signal before it reaches the ECU 56 on delivery line 62. The signal on line 62 indicates to the ECU 56 that the actual ratio does not correspond to the ratio set point and the ECU 56 provides a duty cycle to the solenoid valve 54 on line 64 to compensate for the discrepancy. As the feedback signal is altered by the dither generator 60 prior to entry to the ECU 56, the duty cycle delivered on line 64 will compensate for a discrepancy that is not present and the ratio will accordingly be dithered about its set point value.

Alternatively, a CVT control signal may be produced by an electronic control unit in response to a signal representative of the ratio set point and a feedback signal indicating the actual ratio across the pulleys. The ratio set point may then be dithered directly to alter the ratio across the pulleys. The dithered ratio set point developed by either route may be random or may have a constant periodic frequency unrelated harmonically to the belt-pass frequency. The constant dither signal referred to here need not be sinusoidal, but may follow a complex (but repetitive) schedule.

Regardless of whether a random or periodic dither signal is generated, for a belt-pass frequency of around 20 Hz it is preferred to keep the dither frequency between 5 and 8 Hz. For dither frequencies above 8 Hz the reduction in amplitude of the harmonic peaks is not as significant as for lower frequencies. In practice, at dither frequencies below 5 Hz, the dither signal itself was audible as a "moaning" noise. A sinusoidal dither signal has also been found to be more effective than a signal having a random dither frequency. A feedback signal providing information in relation to the actual frequency of dither at the secondary pulley sheaves can be used to ensure that the frequency of the ratio dither is kept within the 5-8 Hz band. In practice, however, it is only the lower frequency limit that will be of concern as it is unlikely that dither frequencies in excess of 8 Hz are achievable due to the response time of the hydraulic control system. It is also desirable to ensure that the dither frequency is in fact unrelated harmonically to the belt-pass frequency so that peaks at specific harmonic frequencies are not generated. A feedback signal representative of the belt-pass frequency can be provided to the dither generator to ensure that the dither generator always provides a dither signal unrelated to the belt-pass frequency.

Figure 9:
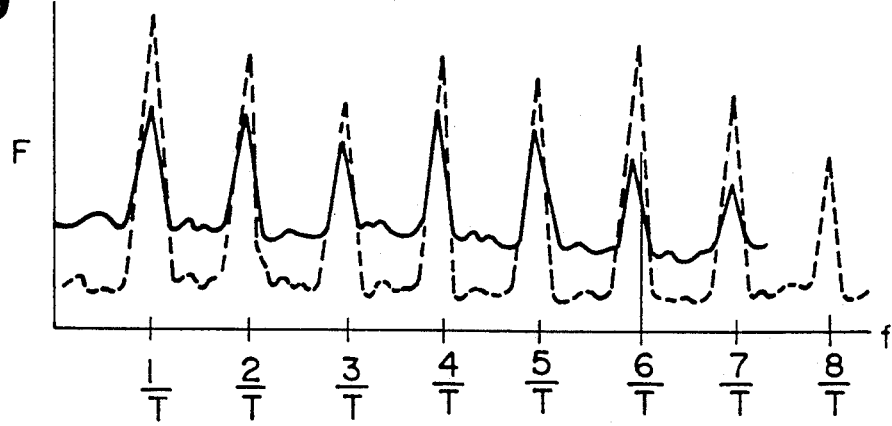
FIG. 9 is a graph showing a comparison of the amplitudes of the harmonic peaks during operation of a chain-belt having regularly spaced load blocks both with and without the noise reduction technique of this invention.

In FIG. 9, a comparison is seen between the noise spectrum in broken lines for a random pitch chain-belt of the type described in U.S. Pat. No. 4,516,964 and the noise spectrum in solid lines of the same belt having the ratio set point controlled by a dithered ratio control signal in accordance with this invention. The energy in the harmonic peaks in the system having a dithered ratio is reduced compared to the energy in the harmonic peaks in the system controlled by the non-dithered ratio signal. With the repetition of forces each cycle substantially reduced, some of the energy in the harmonic frequencies is dispersed to non-harmonic frequencies and the harmonic peaks are correspondingly reduced. In the physiological perception of human hearing, single-frequency harmonics, or "pure tones", are judged louder than noises with equal energy but a distributed frequency range. Thus the noise of the chain-belt is perceived as being quieter.

Although the comparison in FIG. 9 is for a random pitch chain-belt, dithering the ratio set point should achieve similar results with a straight pitch belt. The dither in the ratio across the pulleys modifies the pitch-pass frequency as well as the belt-pass frequency and will therefore disperse some of the energy in the peak at the pitch-pass frequency to other frequencies. As the belt-pass frequency is not constant, energy will be dispersed between harmonic and non-harmonic frequencies alike generating a more random noise pattern.

The system of this invention allows it to be utilized both in conjunction with any random pitch or straight pitch chain-belt. The fact that the noise can be reduced purely through changes made to the sheave control software allows noise to be reduced without changing the hardware of the CVT. This allows the system to be implemented in existing engines, whatever the chain-belt configuration, to "tune" out unacceptably high levels of perceived noise.

While a preferred embodiment of this invention is illustrated, it will be understood, of course that the invention is not limited to this embodiment. Those skilled in the art to which the invention pertains may make modifications and other embodiments employing the principles of the invention, particularly upon considering the foregoing teachings.

What is claimed is:

1. A control system for a continuously variable transmission having a first variable pulley with a first effective diameter disposed on a first shaft, a second variable pulley disposed on a second shaft, and an endless belt means for interconnecting said first and second variable pulleys passing around said pulleys at a belt-pass frequency and transmitting torque therebetween, said control system comprising:
   means for developing a first signal for regulating said first effective diameter of said first variable pulley;
   means for developing a second signal, said second signal having a frequency substantially different from said belt-pass frequency; and
   means for modifying said first effective diameter with said second signal.

2. The control system of claim 1 wherein the frequency of said second signal is substantially less than said belt-pass frequency.

3. The control system of claim 1 wherein said second signal is periodic.

4. The control system of claim 1 wherein said second signal has a random frequency.

5. The control system of claim 1 further comprising means for developing a third signal representative of said belt-pass frequency and wherein said means for developing said second signal is responsive to said third signal.

6. The control system of claim 1 wherein said means for modifying said first effective diameter with said second signal comprises:
   means for developing a feedback signal representative of an actual effective diameter of said first variable pulley; and
   means for superimposing said second signal onto said feedback signal to provide a third signal and wherein said means for developing a first signal is responsive to said third signal.

7. A control system for a continuously variable transmission having a first variable pulley and a second variable pulley and an endless belt means rotating about said variable pulleys at a belt-pass frequency and transferring torque between said first and second variable pulleys, the control system comprising:
   means for developing a first signal representative of a set point ratio between said first and second variable pulleys;
   means for developing a second signal of a frequency or frequency range low relative to the belt-pass frequency;
   means responsive to said second signal for modulating said first signal to provide a third signal; and,
   means responsive to said third signal for regulating said set point ratio between said first and second variable pulleys.

8. The control system of claim 7 wherein said means for developing said second signal is a dither generator.

9. The control system of claim 7 further comprising a fourth signal representative of said belt-pass frequency and wherein said means for developing said second signal is responsive to said third signal.

10. The control system of claim 7 further comprising means for developing a feedback signal representative of an actual set point ratio between said the first and second variable pulleys.

11. A method of reducing the perceived level of noise generated in a continuously variable transmission having a first variable pulley, a second variable pulley, and an endless belt means for interconnecting said first and second variable pulleys, said belt means rotating around said pulleys at a belt-pass frequency and transferring torque between said first and second variable pulleys, said method comprising the steps of:
   developing a first signal for providing a predetermined torque ratio between said first and second variable pulleys;
   developing a second signal of a frequency or frequency range low relative to the belt-pass frequency;
   generating a third signal by modulating the first signal in accordance with the second signal; and,
   regulating the ratio of torque between the first and second pulleys in response to the third signal.

12. The control system of claim 11 wherein said means responsive to said second signal for modulating said first signal comprises means for superimposing said second signal on said feedback signal.

* * * * *

UNITED STATES PATENT AND TRADEMARK OFFICE
CERTIFICATE OF CORRECTION

PATENT NO. : 5,267,907
DATED : December 7, 1993
INVENTOR(S) : Robert A. Hedeen

It is certified that error appears in the above-indentified patent and that said Letters Patent is hereby corrected as shown below:

In column 1, line 49, delete "examples" and substitute therefor --example--.

In column 6, line 62, before "each" insert "of".

Signed and Sealed this

Fourteenth Day of February, 1995

Attest:

BRUCE LEHMAN

*Attesting Officer*   *Commissioner of Patents and Trademarks*